INVENTORS
CHARLES H. SMOOT
WOLFGANG W. BERGER
HAROLD P. ADAMS
JAMES R. SWANSON

BY Strauch, Nolan & Neale

ATTORNEYS

United States Patent Office 3,115,778
Patented Dec. 31, 1963

3,115,778
FLOW RESPONSIVE DEVICE
Charles H. Smoot, Deerfield, Ill., Wolfgang W. Berger, Houston, Tex., and Harold P. Adams, Norridge, and James R. Swanson, Chicago, Ill., assignors to Rockwell Manufacturing Company, Pittsburgh, Pa., a corporation of Pennsylvania
Filed Feb. 5, 1960, Ser. No. 6,952
10 Claims. (Cl. 73—205)

This invention relates to transmitters which are responsive to the flow of fluids and more particularly to means for producing a transmitter output signal which is linearly proportional to the rate of fluid flow in a conduit.

The measurement of the flow of fluid (for example, gas) in a conduit is customarily accomplished by means of a restriction (such as an orifice plate) in the conduit, the flow of fluid through this restriction causing a pressure drop across it which is measured to produce an indication of the rate of fluid flow. The rate of fluid flow through any conduit containing a restriction may be expressed in terms of pressure drop across the restriction as follows:

$$Q^2 = K \Delta P$$

where Q is the rate of flow, K is a constant and ΔP is the difference in pressure across the restriction.

In the operation and control of industrial processes, it is often desirable to produce an output signal or other indicia of the flow rate which varies linearly with the flow rate. For example, it may be desirable to vary the position of a valve or some other control device in accordance with the rate of flow through the conduit. In such a case, it is customary to utilize a pressure sensitive element to sense the rate of flow in the conduit to produce a transmitter output either in mechanical or electrical form which is utilized to control the position of the valve.

As seen from the above expression, however, since the drop in pressure (ΔP) across the restriction in the conduit varies in accordance with the square of the rate of fluid flow (Q), the conventional differential pressure sensing devices such as bellows, diaphragms, etc., produce an output (for example, in the form of a force or displacement) which varies with the square of the fluid flow. In order that the position of the valve or other device responsive to the output signal be controlled linearly in accordance with the flow rate, it is necessary that the signal produced by the pressure sensing device be modified in some manner to produce a signal or indicia which varies linearly with the flow rate.

It is accordingly a primary object of the instant invention to provide means for producing a transmitter output signal which is linearly proportional to the rate of fluid flow in a conduit.

It is another object of the instant invention to provide means for sensing the pressure drop across a restriction in a fluid conduit by conventional sensing means and to translate the output of the sensing means from one varying proportionally with the square of the fluid flow in the conduit to one varying linearly therewith.

It is a further object of the present invention to provide means responsive to the pressure drop across a restriction in the path of fluid flowing in a conduit and which is capable of producing an electrical output signal directly proportional to the rate of fluid flow through the conduit.

It is another object of this invention to provide a transmitter in which the output from a sensing means responsive to the drop in pressure across a restriction in the path of fluid flowing in a conduit is opposed or modified by a feed back force, the effect of which varies substantially with the square of the rate of fluid flow in the conduit whereby the final output of the transmitter varies linearly with the rate of fluid flow in the conduit.

It is a still further object of the instant invention to provide a transmitter in which the output of a sensing means responsive to the drop in pressure across a restriction in a conduit exerts a moment about a fixed point which varies in accordance with the square of the rate of fluid flow in the conduit, which moment is opposed by a second moment the value of which varies in accordance with the square of the rate of fluid flow in the conduit whereby the value of the final output of the transmitter is made to vary linearly with the rate of fluid flow in the conduit.

It is an additional object of the present invention to provide apparatus capable of translating the output of a differential pressure responsive means sensing the rate of fluid flow through a restriction in a fluid conduit into a signal varying linearly with the rate of fluid flow in the conduit, said apparatus comprising a square root extracting mechanism consisting essentially of a cam lever mounted for pivotal movement about a pivot axis and which is responsive to opposing torques acting upon it, one of the torques being produced by the force emitted by the differential pressure responsive means acting through a moment arm, the other being produced by the application of a substantially constant pressure through a moment arm which is variable in length proportionally to the square of the rate of fluid flow.

These and other objects of the invention will become more fully apparent as the description proceeds in connection with the accompanying drawings wherein:

FIGURE 6 is a front elevation of the assembly shown in FIGURE 5;

In general, the apparatus of the instant invention comprises in combination three interrelated mechanisms: a conventional pressure responsive device which is responsive to the flow of fluid in a conduit, a square root extracting mechanism and a differential transformer which is responsive to the resultant signal from the latter. The square root extracting mechanism consists essentially of a cam lever which is mounted for pivotal movement about a pivot axis and which is responsive to opposing torques acting upon it, one of the torques being produced by the force emitted by the pressure responsive device acting through a moment arm, the other being produced by the application of a substantially constant force through a variable moment arm. By varying the latter moment arm substantially in proportion to the square of the rate of fluid flow by means of a cam having the proper profile characteristic, the resultant pivotal movement of the cam lever will be proportional to the rate of fluid flow in the fluid conduit.

Figure 1:
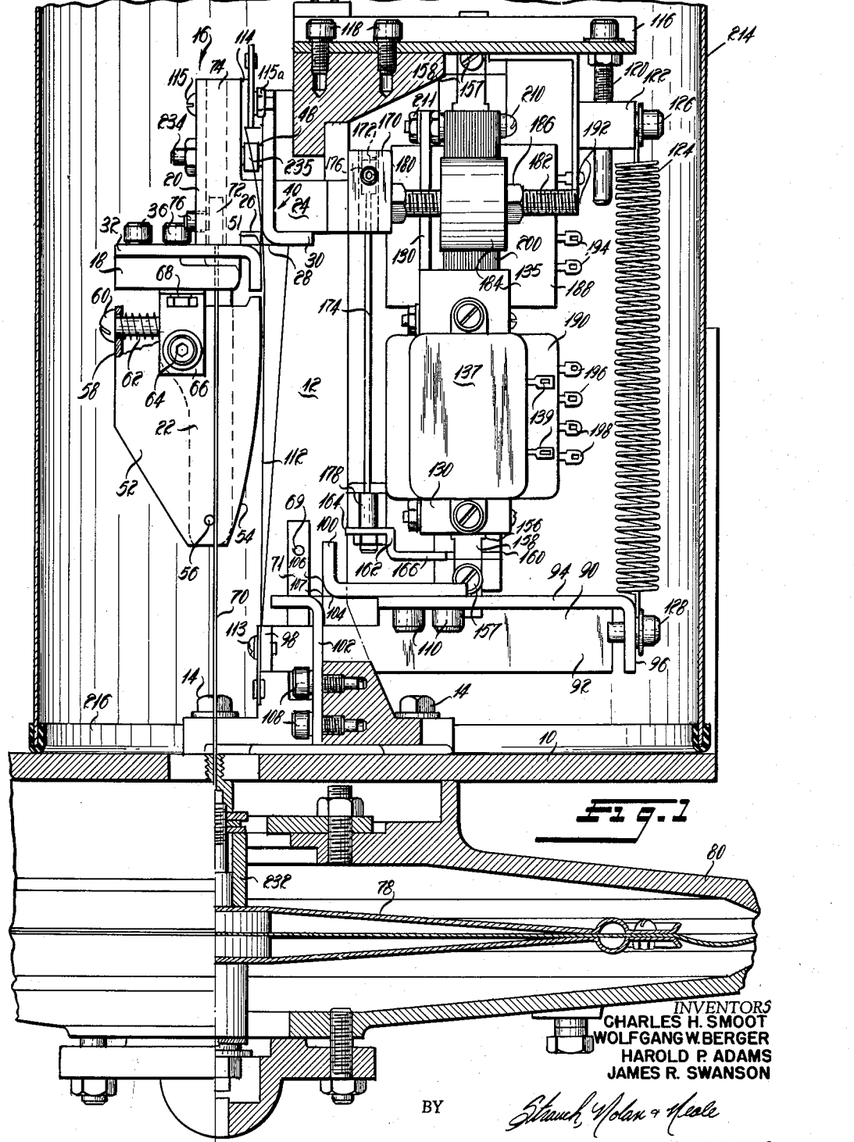
FIGURE 1 is a partially cut-away front elevation of a transmitter adapted to modify the output from a pressure sensing device in accordance with the teachings of the present invention to produce a final output signal which varies linearly with the rate of fluid flow in a conduit.
Figure 2:
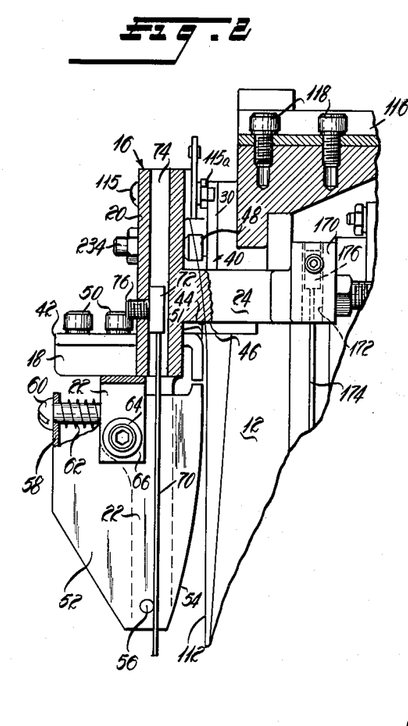
FIGURE 2 is a fragmentary section of the transmitter shown in FIGURE 1 showing details of construction of a cam and cam lever forming essential elements of the instant device.
Figure 3:
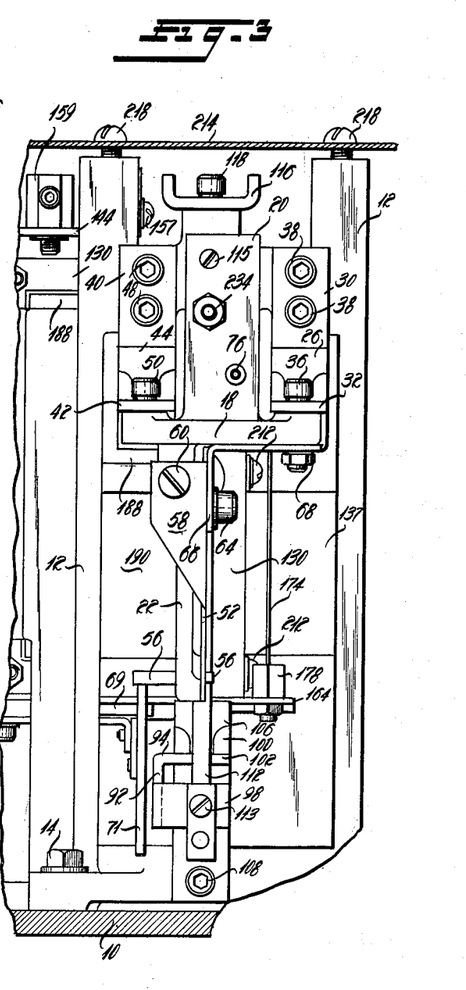
FIGURE 3 is a side elevation of a portion of the transmitter, as viewed from the left in FIGURE 1.
Figure 4:
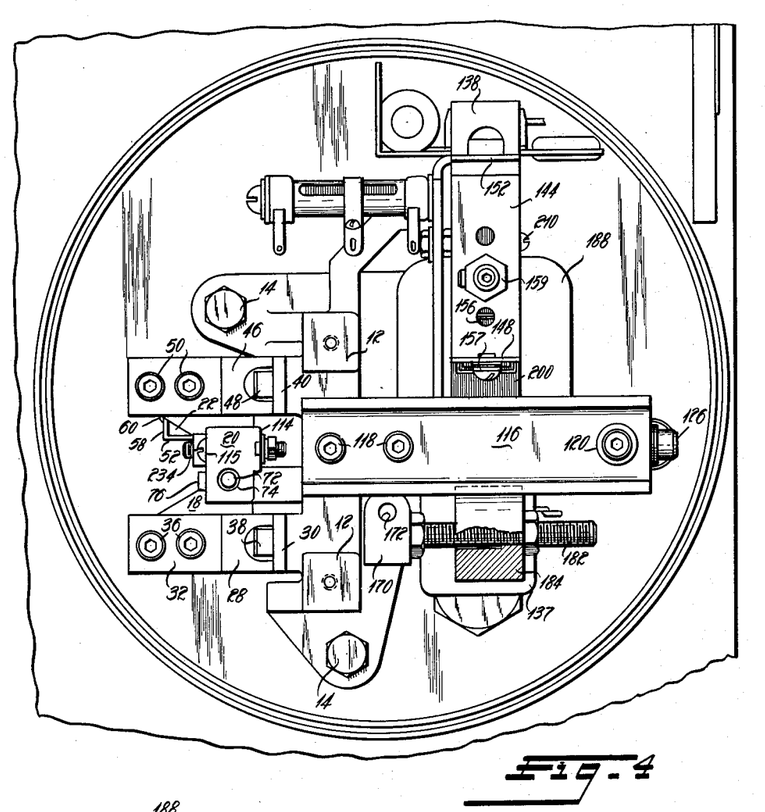
FIGURE 4 is a top plan view of the transmitter shown in FIGURES 1 and 3.
Figure 5:
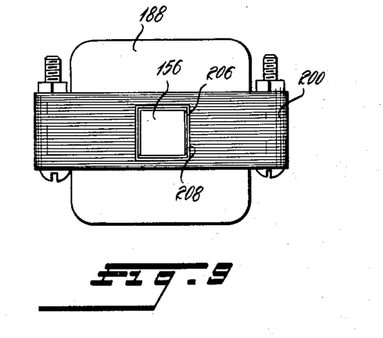
FIGURE 5 is a side elevation of a leaf spring-fulcrum assembly used in connection with the instant device.

More specifically, and as shown particularly in FIGURES 1–7, the novel apparatus of the instant invention comprises a base plate 10 having rigidly mounted thereon, by means of bolts 14, a main frame 12. A cam lever 16, which is pivotally secured to the upper part of main frame 12 by means of two coaxial axially spaced leaf spring-fulcrum assemblies, is made up of a horizontal mounting pad 18, an upwardly projecting tubular section 20, a lower extension 22 (shown partly in broken lines) depending from mounting pad 18 and a projection 24 which extends horizontally from the tubular section 20. One of the leaf spring-fulcrum assemblies (see FIGURES 5–7), which is shown in FIGURE 1 as being in front of tubular section 20, consists of normally mutually perpendicular interfitting leaf springs 26 and 28 and fulcrum angles 30 and 32. Leaf spring 28 is provided with a slot 34 and is spot welded at one end to the long arm of fulcrum angle 32 and at the other end to the short arm of fulcrum angle 30. Leaf spring 26 is an I-shaped element whose head and base are respectively spot welded to the long arm of fulcrum angle 30 and the short arm of fulcrum angle 32 and whose leg passes freely through slot 34 in leaf spring 28. As shown in FIGURES 1, 3 and 4, the long arm of fulcrum angle 32 is secured to mounting pad 18 by means of bolts 36 perpendicularly to the long arm of fulcrum angle 30, which is secured to main frame 12 by means of bolts 38 (FIGURE 3).

A second leaf spring-fulcrum assembly, identical to that described above, consists of fulcrum angles 40 and 42 and leaf springs 44 and 46 (see FIGURES 2, 3 and 4), the long arm of fulcrum angle 40 being secured to main frame 12 by bolts 48 perpendicularly to the long arm of fulcrum angle 42, which is secured to mounting pad 18 by means of bolts 50.

As shown in FIGURES 3 and 4, the two leaf spring-fulcrum assemblies are each secured to a different end of mounting pad 18, one on each side of tubular section 20, so that the entire cam lever is pivotally mounted to frame 12 by means of the two assemblies, permitting the relatively frictionless pivotal motion of cam lever 16 with respect to the main frame about the points of intersection 51 of the leaf springs.

As is best shown in FIGURES 1 and 2, a cam 52, having a cam profile 54, is mounted on the depending lower extension 22 for pivotal motion about a pin 56. Cam 52 also has a laterally projecting ear 58 (FIGURES 1, 2 and 3) through which extends a screw 60, the end of which is threaded into an opposing surface on lower extension 22 of cam lever 16. A spring 62 is compressed between the inside surface of ear 58 and the opposing surface on cam lever 16, tending to urge the cam in a counterclockwise direction about pin 56 against the head of screw 60. The hole in ear 58 through which screw 60 passes is enlarged to provide a loose fit therebetween so that cam 52 may be rotated in either direction about pin 56 by adjusting screw 60.

A socket head screw 64 extends through holes provided in one leg of a bracket 66 and in cam 52 and is threaded into lower extension 22 of cam lever 16. The hole is cam 52 through which screw 64 passes is enlarged to provide a loose fit therebetween to permit limited rotational movement of the cam about pin 56. (The opening in cam 52 is shown diagrammatically in exaggerated form as an arcuate slot in FIGURES 10 and 11.) The other leg of bracket 66 is secured to mounting pad 18 by means of bolt 68.

As is best shown in FIGURES 1 and 3, pivotally and axially slidably mounted on a pin 69 for movement relative to the upstanding portion of main frame 12 is a locking link 71. Locking link 71 has an aperture (not shown) for engagement with the rear end portion of pin 56 projecting from lower extension 22 to effectively lock the cam lever against pivotal movement about pivot point 51 when this is desired, as in shipping. If desired, a clip spring (not shown) may be slipped over the end of pin 56 to lock locking link 71 thereon.

Referring to FIGURE 1, a wire 70 terminates at its upper end in a plug 72 which is received in a vertical bore 74 in tubular section 20 of cam lever 16 and is fixed therein by means of a set screw 76 to thereby anchor the upper end of wire 70 to cam lever 16. The lower end of wire 70 is secured to the diaphragm 78 of a conventional differential pressure responsive mechanism 80 (see FIGURES 1, 10 and 11).

Pressure connections 82 and 84 (see FIGURE 10) are provided in mechanism 80 to connect the fluid chambers at the lower and upper respective sides of diaphragm 78 to the downstream and upstream sides respectively of the metering orifice 86 in conduit 88, the flow through which is to be measured. Thus, the diaphragm is connected across the orifice and the amount of force acting on the diaphragm and tending to displace it will vary in accord with the square of the flow rate of fluid through the conduit, as aforesaid. Since the upper side of the diaphragm is connected to the high pressure side of the orifice, the resultant force on wire 70 will be acting downwardly in the present embodiment.

As shown in FIGURE 1, a lever indicated generally by the numeral 90 has a main body portion 92 and is formed with an upper lateral wall 94 which extends for a portion of its length as shown. The wall 94 has formed integrally therewith a depending ear 96 which extends downwardly from its end to overlie the right-hand end of the main body portion 92. Formed integrally with and extending laterally from the left-hand extremity of the portion 92 is a vertical wall portion 98.

Lever 90 is pivotally mounted with respect to the main frame 12 similarly to the manner in which cam lever 16 is mounted, by means of a leaf spring-fulcrum assembly 100, 102, 104 and 106, so that lever 90 is free to pivot about the axis 107 defined by the intersection of the leaf springs 104 and 106. As shown, fulcrum angle 102 is secured to a lower portion of frame 12 by means of screws 108 and fulcrum angle 100 is secured to upper wall portion 94 of lever 90 by means of screws 110, so that the entire lever 90 is mounted for pivotal motion with respect to the frame 12 about axis 107.

A tape 112 (see FIGURES 1 and 3) has its lower end secured to the wall portion 98 of lever 90 by means of screw 113 and its upper end secured to a mounting pad 114 projecting from the tubular section 20 of cam lever 16 by means of screw 115 and nut 115a. With the tape secured in this manner, a portion of its length will pass closely adjacent but to the right side of the common axis of intersection 51 of leaf springs 26 and 28 and 44 and 46 and closely adjacent to but not in contact with the profile 54 of cam 52 under conditions of zero flow in conduit 88.

One end of a channel member 116 (see FIGURES 1, 3 and 4) is secured to an upper portion of main frame 12 by means of screws 118. The other end of the member 116 extends out beyond main frame 12 to a point where its extreme right end overlies, in vertically spaced relationship thereto, the right end of lever 90. A screw 120 extends through member 116 at its right-hand extremity and is in threaded engagement with a spring support 122. A spring 124 extends between spring support 122 and the right end of lever 90 and has its opposite ends respectively secured thereto by means of screws 126 and 128. The spring is therefore stretched between spring support 122 and the right end of lever 90 and resiliently biases the lever 90 about pivot axis 107 in a counterclockwise direction as viewed in FIGURE 1.

Figures 7, 8, 9, 10:
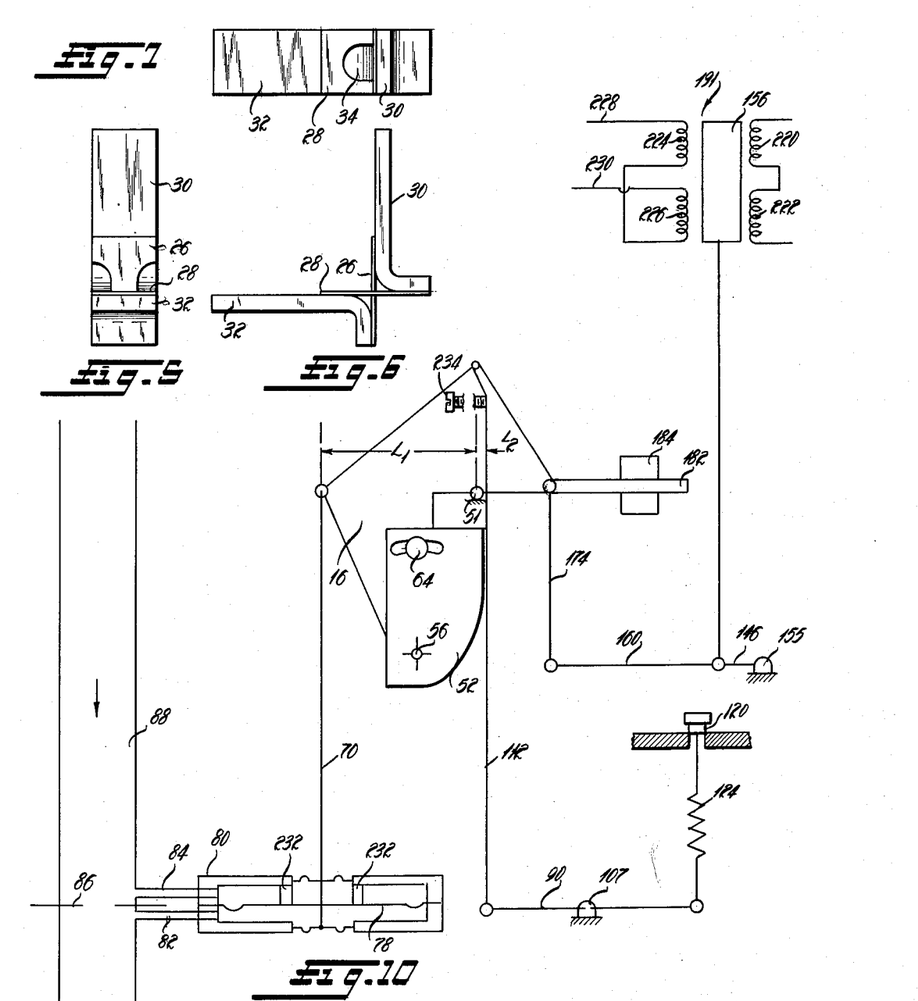
FIGURE 7 is a top plan view of the assembly shown in FIGURES 5 and 6.
FIGURE 8 is a side elevation of a portion of the transmitter shown in FIGURE 1 showing the side opposite that shown in FIGURE 3.
FIGURE 9 is a top plan view of the different transformer forming part of the instant apparatus and shown in FIGURE 8.
FIGURE 10 is a schematic diagram of the apparatus shown in the foregoing figures, together with a pressure sensing diaphragm unit, showing the position of the various elements at zero flow condition.
Figure 8:
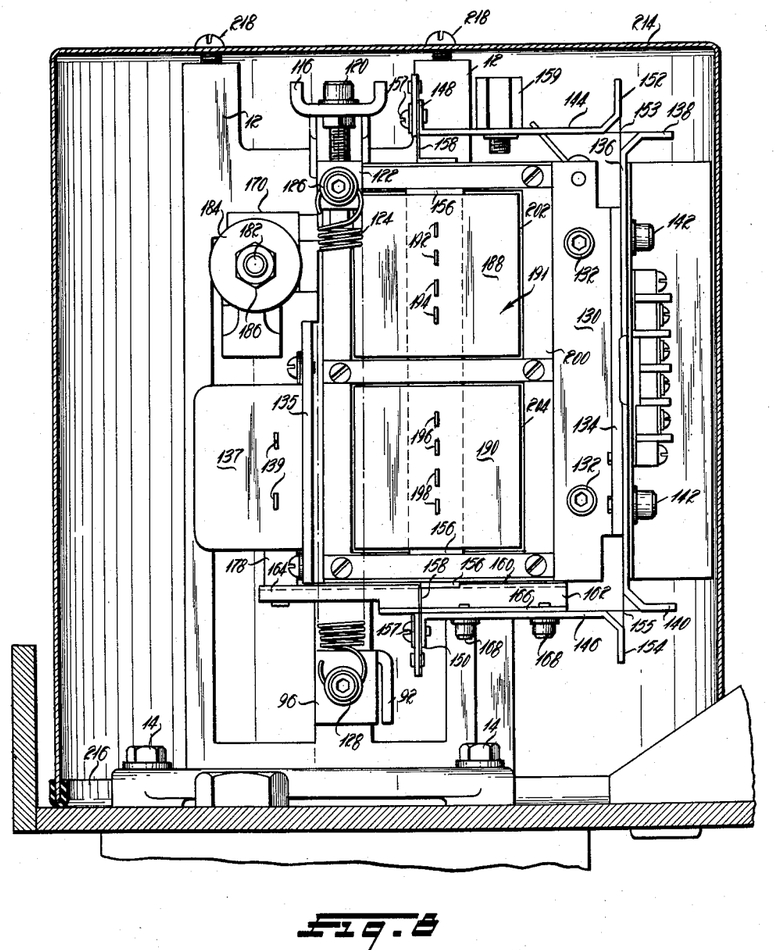

As best shown in FIGURE 8, a mounting frame 130 is rigidly secured to main frame 12 by means of screws 132. Side walls 134 and 135 extend at right angles from the respective sides of mounting frame 130 for a portion of its length. Secured to side wall 135 is a condenser 137 having terminals 139. A fulcrum support 136, having angle portions 138 and 140 respectively extending from its upper and lower ends, is secured by means of screws 142 to the other side wall 134 of the mounting frame. Fulcrum levers 144 and 146 are respectively provided at one end with laterally projecting ears 148 and 150 and at the other with angle portions 152 and 154. Each of fulcrum levers 144 and 146 is pivotally mounted at its end adjacent its respective angle portion to opposite ends of the fulcrum support 136 by means of leaf spring members, in a manner identical to that explained above in connection with the leaf spring-fulcrum support assemblies heretofore described, to permit pivotal motion of fulcrum levers 144 and 146 about the respective lines of intersection 153 and 155 of the leaf springs connecting them to the opposite ends of fulcrum support 136. A zero adjustment block 159 is mounted in any one of a plurality of spaced apertures suitably provided in fulcrum lever 144 for zero adjustment of the position of fulcrum lever 144 and, correspondingly, armature 156. Ears 148 and 150 are respectively connected by means of screws 157 to tabs 158 projecting outwardly from the upper and lower ends of an armature 156.

As shown in FIGURES 1 and 8, an armature lever 160 is comprised of a main vertical wall 162 having an upper horizontal flange 164 and a lower horizontal flange 166, each extending at right angles and in respectively opposite directions from the main wall 162. The lower flange 166 overlies and is secured to the lower fulcrum lever 146 by means of bolts 168.

Projection 24 of cam lever 16 is provided at its right hand extremity, as viewed in FIGURE 1, with an integrally formed cylindrical boss 170 having a vertical bore 172 extending therethrough. A wire 174 terminates at its upper end in a plug 176 and at its lower end in a plug 178. Plug 176 is received in the bore 172 and locked therein by means of set screw 180 so as to fix the upper end of the wire 174 to projection 24. Plug 178 is bolted to the upper horizontal flange 164 of armature lever 160 to fix the lower end of wire 174 to the left-hand extremity of the armature lever 160, as viewed in FIGURE 8.

As best shown in FIGURE 1, a threaded screw 182 extends from the right-hand extremity of projection 24 of cam lever 16. A counterweight 184, which is threaded onto screw 182, is adjustable to any lateral position therealong and may be fixed in any adjusted position by means of a lock nut 186 as shown.

A differential transformer unit, which contains an upper set 188 of one primary and one secondary coil and a lower set 190 of one primary and one secondary coil, is indicated generally at 191 in FIGURE 8. The ends of the primary and secondary coils of the upper set 188 are made accessible for connection in a control circuit by means of terminals 192 and 194, respectively. Similarly, the ends of the primary and secondary coils of the lower set 190 are made accessible through terminals 196 and 198, respectively.

The core 200 is made up of laminations (see FIGURES 1, 8, 9) which, when stacked together, provide upper and lower windowlike openings 202 and 204 to receive coil sets 188 and 190, respectively. As best shown in FIGURE 9, the inner laminations of the core are interrupted in their upper, lower and central portions to provide an opening 206 therein for the reception of the armature 156, which is also laminated. As is well understood, the coil sets 188 and 190 have vertical central openings which register with the openings in the core structure to provide a continuous vertical passage through the core and coils for the reception of a coil support 208, which provides a support for the coils in the window openings 202 and 204 of the core structure and which furnishes a continuous vertical opening for the reception and limited vertical motion of armature 156. Since, as aforesaid, armature 156 is secured by means of tabs 158 to ears 148 and 150 of fulcrum levers 144 and 146, respectively, the entire armature assembly is effectively suspended between upper and lower fulcrum levers 144 and 146 for limited reciprocal motion within the opening provided in coil support 208.

The entire assembly, consisting of the differential transformer unit 191, fulcrum levers 144 and 146, armature lever 160 and armature 156, is secured to the mounting frame 130 by means of bolts 210 and nuts 211 in such a position that the left end of armature lever 160 as viewed in FIGURE 8 is directly beneath the cylindrical boss 170 on cam lever 16, to permit the upper end of wire 174 to be connected to boss 170 and its lower end to the end of armature lever 160 in the manner above described.

A cover 214 is provided to enclose the entire square root extracting mechanism heretofore described. The bottom edge of the cover is provided with a rubber grommet 216 and the cover is held in place and the rubber grommet pressed in airtight sealing engagement against base plate 10 by means of screws 218 which pass through the cover and are threaded into the top of mounting frame 12.

Figure 11:
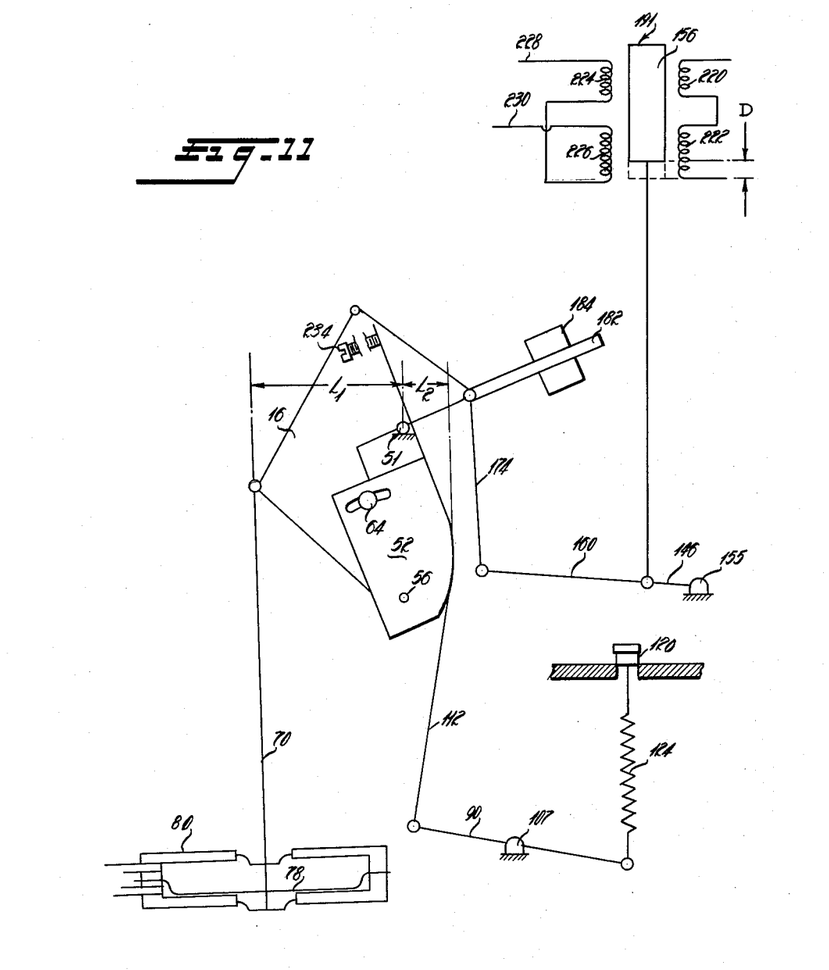
FIGURE 11 is a schematic diagram similar to that of FIGURE 10 showing the position of the various elements under conditions of full rated flow.

The coils of the differential transformer unit 191 are connected together, as shown schematically in FIGURES 10 and 11, whereby an output voltage is produced which varies linearly with displacement of the armature 156. As shown, the primary 220 of the upper coil set 188 is connected in series with the primary 222 of the lower coil set so that the voltages across coils 220 and 222 are additive, the two coils being connected across a suitable source of power (not shown). The secondaries 224 and 226 are connected together in series opposition so that the voltages induced in the secondaries oppose each other. Thus, the voltage between lines 228 and 230 represents the difference between the voltages induced in the secondary coils 224 and 226. As is well known in the transformer art, when voltage is applied to the primaries 220 and 222, the voltages induced in the respective secondaries 224 and 226 will vary with the position of armature 156.

With the armature in the position shown in FIGURE 10, the voltages induced in secondaries 224 and 226 are equal and will balance each other so that the voltage across lines 228 and 230 is zero. As the armature moves upwardly from its initial position, as shown in FIGURE 11, the magnetic coupling between primary 220 and secondary 224 will remain substantially unchanged while the magnetic coupling between primary 222 and secondary 226 will decrease, causing the voltage induced in secondary 226 to be reduced. Thus, the voltage across the lines 228 and 230 will increase in one direction as the armature 156 is moved upwardly from its initial position and would increase in the opposite direction if the armature 156 were moved downwardly from its initial position, and the value of the voltage in either direction will vary linearly with the position of the armature 156.

The operation of the instant invention can best be understood by reference to FIGURE 10 which shows, schematically, the positions of the elements when there is no flow in conduit 88. In this condition, the position of the armature 156 is such that the voltages across secondary coils 224 and 226 are equal and opposite and the voltage between lines 228 and 230 is zero. As the flow increases in conduit 88 in the direction indicated by the arrow, the pressure drop across orifice 86 will increase, increasing the force on diaphragm 78, tending to move it downwardly. This force is transmitted through wire 70 to cam lever 16, tending to rotate the lever in a counterclockwise direction about pivot point 51. This counterclockwise motion of cam lever 16, through wire 174 and armature lever 160, causes fulcrum lever 160 to rotate about pivot point 155 to move armature 156 upwardly from the initial position shown in FIGURE 10. This upward movement of the armature, as explained above, will cause a voltage to appear across lines 228 and 230, the value of which is directly proportional to the amount of movement of the armature. The rotation of cam lever 16 under influence of the increased force on diaphragm 78 is transmitted to and is resisted by spring 124 through lever 90 and tape 112, and cam lever 16 will continue to rotate until the clockwise moment applied to the cam lever 16 due to the tension in spring 124 counterbalances the counterclockwise moment applied to lever 16 by the force exerted by diaphragm 78.

At a balanced condition, the moments acting on cam lever 16 may be stated by the following expression:

$$F \times L_1 = T \times L_2$$

where F is the force on the wire 70, $L_1$ is the moment arm extending from the point of application of the force F to cam lever 16 to the point about which the cam lever rotates, T is the force on tape 112 due to spring 124 and $L_2$ is the effective moment arm of the force T on tape 112 about the point 51. Under conditions of zero flow in conduit 88, there is no pressure drop across the diaphragm 78 and the spring 124 will act on cam lever 16 to hold the diaphragm in its uppermost position against stop members 232 (FIGURE 1), at which position there is no contact between the cam profile 54 and tape 112. At this condition, the counterweight 184 may be adjusted on screw 182 to exactly counterbalance the effect of the weight of cam lever 16 and associated elements on the one hand and the effect of spring 124 on the other so that upon the occurrence of a slight amount of flow in conduit 88, sufficient force will be applied to diaphragm 78 to cause rotation of cam lever 16.

As heretofore mentioned, the relationship between fluid flow through orifice 86 and the pressure drop across the orifice is given by the expression:

$$Q^2 = K \Delta P \text{ or } \Delta P = Q^2/K$$

Since the force F on diaphragm 78 is directly proportional to the pressure drop across the orifice, the force F on wire 70 will vary as the square of the fluid flow and may be stated:

$$F \propto Q^2$$

Since the angular movement of cam lever 16 about point 51 and the displacement of armature 156 from its zero position vary directly and linearly with the effective moment acting on cam lever 16, in the absence of the compensating effect of the instant invention the displacement of the armature 156 will vary with the force F or square of the rate of flow Q. The displacement of armature 156 can therefore be substituted for the force F in the above expression: thus, $$\text{armature displacement} \propto Q^2$$

It is clear that under these conditions, a curve showing the relationship between the armature displacement and rate of fluid flow (Q) is parabolic in form. Such a curve is shown in FIGURE 12 as curve A.

Figure 12:
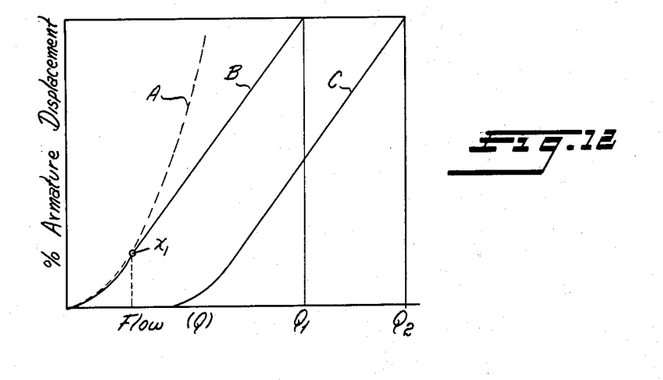
FIGURE 12 is a chart of curves showing the relationship between the flow of fluid and the displacement of the armature of the differential transformer of the instant device under various conditions.

In accordance with the present invention, the relationship between armature displacement (as measured by the electrical output of the differential transformer) and the rate of fluid flow (Q) may be rendered linear, as shown in the straight line curve B in FIGURE 12, by modifying the effect of spring 124 in its resistance to the torque applied to cam lever 16 through wire 70. This is done through the medium of cam 52, which serves to increase the moment arm $L_2$ proportionally to the increase in the square of the fluid flow (Q) as cam lever 16 is rotated in a counterclockwise direction under the influence of the moment $F \times L_1$.

Since the movement of cam lever 16 throughout the range of operation of the transmitter is such that no appreciable change in the moment arm $L_1$ takes place, moment arm $L_1$ can be considered as being substantially constant. Initially, at the zero flow condition, profile 54 of cam 52 does not contact tape 112 so that some initial movement of cam 52 is necessary before contact between the two is made. This means that some initial minimum flow must take place in conduit 88 before the compensating effect of cam 52 will be brought into operation. As flow in the conduit begins, the force F on wire 70 is increased in a downward direction due to an increase in flow in conduit 88 and cam lever 16 will rotate in a counterclockwise direction, resisted by the moment imposed on cam lever 16 by the tension in tape 112 and the moment arm $L_2$, until the cam profile 54 engages tape 112. During this initial range of flow, the relationship between armature displacement and flow will follow a parabolic path, the point of contact between profile 54 and tape 112 being indicated as point $X_1$ on curve B of FIGURE 12. Upon further rotation of cam lever 16, the tape 112 will be moved to the right by cam 52, away from pivot point 51, and the moment arm $L_2$ of the tension T in tape 112 will be increased, thus increasing the resisting moment applied to cam lever 16 by spring 124. As cam lever 16 continues to rotate about pivot point 51 under the influence of the force F, the moment arm $L_2$ will be progressively increased until the elements reach a position where the resisting moment on cam lever 16 due to the tension of spring 124 on tape 112 is equal to the moment due to the force F on the wire 70 and the moment arm $L_1$. FIGURE 11 shows the relative position of the elements at full scale displacement.

From the zero flow positions of the elements, as shown in FIGURE 10, to the 100% flow position, as shown in FIGURE 11, cam lever 16 rotates through an angle $\theta$ and armature 156 is moved a corresponding distance D, its position at zero flow being indicated on FIGURE 11 in broken lines. Thus, as cam lever 16 rotates, successive points on the cam profile 54 are contacted by tape 112; by forming the cam profile 54 with the proper curvature characteristic, the moment arm $L_2$ will vary substantially proportionally to the square of the rate of fluid flow (Q) for each change in position of cam lever 16, and the resisting torque $T \times L_2$ will be correspondingly varied in such a manner that the movement of the cam lever 16 and armature 156 will vary directly and linearly with the flow of fluid (Q) through conduit 88 and the relationship between the flow in the conduit and armature 156 will be as shown by curve B of FIGURE 12.

In order to secure accuracy of calibration and operation and to keep the various elements as small as possible, it is desirable that tape 112 be as close as possible to pivot point 51 when the transmitter is in the zero flow position. The initial position of tape 112 may be adjusted relative to pivot 51 by merely threading screw 234 (see FIGURE 1) into or out of cam lever 16 to shift the position relative to cam lever 16 of its tip 235 against which tape 112 rests.

As above stated, at zero flow the cam profile 54 is not in contact with tape 112 and during initial minimum flow, until cam lever 16 is rotated sufficiently to bring cam profile 54 into contact with tape 112, the effect of cam 52 will not be reflected in the transmitter output and the transmitter will be operating on the parabolic portion of the curve B of FIGURE 12. The point at which cam profile 54 contacts tape 112 is indicated as point $X_1$ on curve B.

Although this invention contemplates a transmitter wherein the various moving elements encounter a minimum of friction, it will be understood that there still remains in any mechanical device embodying moving elements an irreducible amount of friction which must be overcome in the operation of the device. This friction causes losses which remain substantially constant throughout the operating range of the instrument. Since the force required to overcome this friction must be supplied by the input which, in the present case, is the force on the diaphragm 78, the accuracy of the transmitter may be affected, particularly at the low flow rates where the work necessary to overcome these relatively fixed losses is significant as compared to the energy input to the transmitter. However, since the work required to overcome this friction loss is small as compared to the energy input at the normal operating level and remains relatively constant throughout the operating range of the transmitter, the effect is negligible except at extremely low flow rates or, in other words, at the lower end of the operating characteristic, as shown in FIGURE 12. Since the effect of cam 52 and tape 112 is to provide a progressive increase in the resisting moment exerted by spring 124, this resisting moment, if effective at low flow rates, would merely reduce the amount of energy available at low flow rates to overcome the fixed losses. Thus, in order to provide as much force and energy input as possible to overcome the fixed losses due to friction, it is desirable that the square root extracting elements of the transmitter remain ineffective at the lower flow rates.

The point at which the square root extracting mechanism becomes effective, that is the point where cam 52 first contacts tape 112 (point $X_1$ on curve B), is selected to coincide with the point where the input energy level is sufficiently high to render negligible the effect of these fixed losses. Generally, by careful design of the various elements, this point may be kept below 20% of full rated capacity of the instrument and in some cases, may be as low as 5% thereof. It is, of course, desirable that this point be held to as small a percentage of full rated capacity as possible. Over this point, the work input is such that these losses have a negligible effect on the operation of the transmitter. Thus, it is desirable to be able to adjust the point at which the tape 112 is contacted by cam profile 54 (point $X_1$ on curve B). This may be done by simply loosening screw 64 and adjusting screw 60 to move cam profile 54 toward or away from tape 112 to locate point "X" at a value of the fluid flow where the energy input level is sufficient to render the effect of the fixed losses negligible.

Various other adjustments are provided to vary the range of the transmitter and to adjust its zero position. The effects of these adjustments on the operating characteristic of the transmitter can best be understood by reference to FIGURES 12, 13 and 14. In FIGURE 12 as above stated, curve B represents the transmitter characteristic under the condition when a flow rate of $Q_1$ will produce full 100% displacement of the armature or 100% output capacity of the differential transformer. If it is desired to increase the operating range, or in other words, to increase the quantity of fluid flow which will produce 100% displacement of the armature 156, the tension in spring 124 may be increased by adjustment of screw 120. This increases the amount of the resisting moment spring 124 is capable of exerting on cam lever 16 for a given moment arm and therefore a greater force on the diaphragm 78 will be necessary to produce 100% displacement of the armature. However, this also increases the amount of initial flow necessary to produce initial movement of the armature. Therefore, the effect of increasing the tension on spring 124 is to produce a curve parallel to and having the same slope as curve B but displaced therefrom, as shown by curve C in FIGURE 12, where $Q_2$ represents the value of the increased flow necessary to produce 100% displacement of the armature.

It will be noted that the point at which the curve intersects the X-axis of the diagram, which is the point at which cam lever 16 first begins to rotate, is substantially displaced from the point of zero flow, indicating that some initial flow is now necessary to produce initial movement of cam lever 16 and armature 156. In order to make the position of zero displacement coincide as nearly as possible with zero flow, screw 234 (see FIGURE 1) may be adjusted to decrease the initial amount of moment arm $L_2$ at zero flow. This has the effect of reducing the initial resisting moment exerted by spring 124 without affecting the value of the flow necessary to produce 100% displacement of the armature and will tend to move the point of initial displacement toward the point of zero flow.

Figure 13:
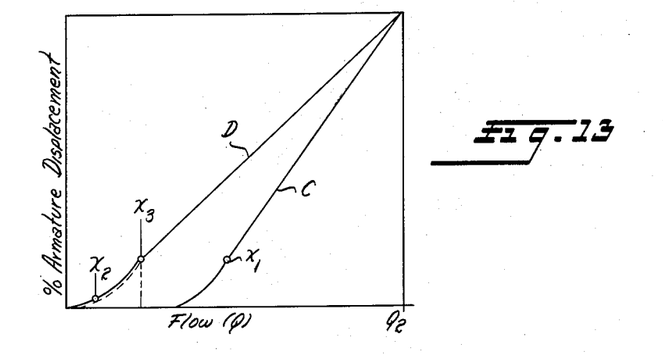
FIGURE 13 is a chart of curves showing the effect of various calibration adjustments on the relationship between the flow of fluid and the displacement of the armature of the differential transformer of the instant device.

The effect of this adjustment on the operation of the transmitter is to produce a characteristic as shown by curve D in FIGURE 13. As before, cam lever 16 and armature 156 will be displaced until the resisting moment is equal to the moment caused by the pressure differential on the diaphragm 78. However, since the tension on spring 124 has been increased by adjustment of screw 120, a greater force (and greater flow) will be necessary to produce full scale displacement of armature 156. Since adjustment of screw 234 did not affect the tension in spring 124, the moment arm $L_2$ at a flow of $Q_2$ will be the same after adjustment of screw 234 as it was before. Thus, the displacement of cam lever 16 at a flow of $Q_2$ remains the same after adjustment of screw 234 as before and since the point of full scale (100%) displacement of the armature is not affected, the effect of adjustment of screw 234 is to change the slope of the transmitter characteristic to that shown by curve D in FIGURE 13 without changing the point $Q_2$ at which 100% displacement takes place. As shown, the effect of this adjustment is to change the slope of the characteristic curve and to bring the point of initial displacement of the armature near the point of zero flow. However, since tape 112 is moved closer to the cam profile 54 by this adjustment, the amount of rotation required of the cam lever 16 before contact is made with the tape is now reduced, thereby reducing the parabolic portion of the characteristic. The point where the cam 52 now becomes operative is shown as $X_2$ on curve D and, as is apparent, is now considerably below the optimum point indicated as point $X_1$ in FIGURE 12.

Figure 14:
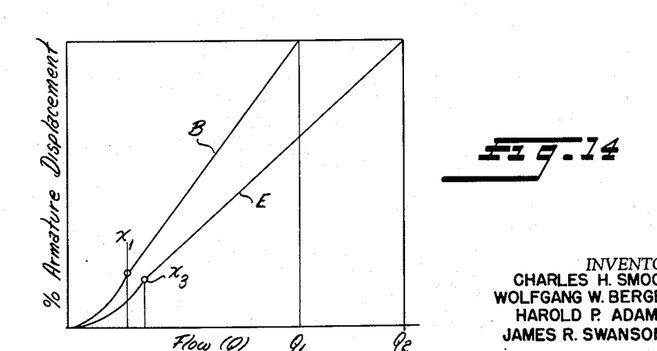
FIGURE 14 is a chart of curves showing the relationship between the flow of fluid and the displacement of the armature of the differential transformer of the instant device under two different selected ranges of fluid flow.

Since it is desirable that the transmitter operate on the parabolic portion of the curve up to the optimum point, it is necessary to re-adjust the position of cam 52 about its pivot point by means of screw 60 to increase the distance between cam profile 54 and tape 112 at initial conditions and thereby increase the amount of initial rotation of cam lever 16 which is necessary to bring cam profile 54 into contact with tape 112. Adjustment of cam 52 in this manner will have the effect of increasing the parabolic portion of curve D to that shown by dotted lines in FIGURE 13 so that the point of first contact between the cam profile 54 and tape 112 again takes place at approximately the optimum point. This new point where cam profile 54 contacts tape 112 is shown on curve D as $X_3$. Any variation in the point of initial displacement of the armature from the point of zero flow which may have been caused by the foregoing adjustments may now be corrected by a simple adjustment of counterweight 184 to produce a new characteristic curve E, which is shown in FIGURE 14 compared to the original characteristic curve B. Thus, the adjustments above described provide a means of adjusting the operating range of the transmitter while maintaining correct calibration and accurate operation of the instrument.

It should be understood, of course, that in practice, the relationships between the various elements may vary somewhat from the theoretical. For example, in the foregoing, it was assumed that the force F on the wire 70 was linearly proportional to the pressure (ΔP) acting on diaphragm 78. In practice, it is known that the effective area of diaphragm 78 may vary slightly depending on its position and thereby resulting in a slight non-linearity in the relationship between the force F and ΔP. Also, the force exerted by spring 124 and thus the value of the tension T on tape 112, may vary slightly, depending on the position of lever 16. Other possible sources of possible deviation from theoretical values and/or losses in the apparatus are in the differential transformer and the various mechanical linkages involved. In each of these cases, the departure from assumed theoretical relationship is repeatable; that is, each time a given condition is applied to the various elements, the amount of error or deviation from the assumed theoretical relationship between the various elements involved is the same. All of these factors, therefore, combine to make the relationship between input (ΔP) and the output (voltage between lines 228 and 230) vary slightly from the theoretical. Since this deviation from the theoretical is repeatable, any inaccuracies which would otherwise be thereby introduced may be compensated for by properly shaping the profile of cam 52 which will, in most cases, result in a cam surface which deviates slightly from a true parabolic shape.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a flow responsive device: a lever mounted for pivotal movement about a pivot axis; means for applying an input force to said lever at a distance from its pivot axis to apply a torque to said lever continuously proportioned to the magnitude of said input force, said input force being variable proportionally to the square of a measured variable; means for applying a balancing torque to said lever solely by applying a substantially constant opposing force thereto at a distance from its pivot axis which varies with the pivoted position of said lever proportionally to the magnitude of said input force, whereby the resultant pivoted movement of said lever is proportional to the square root of the input force applied thereto; and means responsive to movement of said lever for producing an electrical output control signal proportional to the magnitude of the movement of said lever, said balancing torque applying means comprising means for producing a substantially constant force; a connection between said force producing means and said lever; means responsive to variations in the angular position of said lever about its pivot axis for varying the moment arm through which the force of said constant force producing means acts to produce a balancing torque, said lever being arranged relative to said constant force producing means to pivot through a predetermined angular distance before said constant force becomes effective to produce movement of said lever which is proportional to the square root of said input force, and means for selectively varying said predetermined angular distance.

2. The combination defined in claim 1 wherein said connection comprises a flexible inextensible tape connected at one end to said lever and at the other end to said constant force producing means and wherein said moment arm varying means comprises a cam fixed to said lever and having its profile engageable with said tape intermediate the points of connection thereof to said force producing means and to said lever.

3. The combination defined in claim 2 wherein said cam profile has a curvature characteristic which is effective to vary said moment arm proportionally to the magnitude of the input force to said lever.

4. In a flow responsive device: a lever mounted for pivotal movement about a pivot axis; means for applying an input force to said lever at a distance from its pivot axis to apply a torque to said lever continuously proportioned to the magnitude of said input force, said input force being variable proportionally to the square of a measured variable; means for applying a balancing torque to said lever, said last mentioned means including means connected to said lever by means of a flexible inextensible tape for producing a substantially constant force; a cam fixed to said lever and having its profile engageable with said tape intermediate the points of connection thereof to said force producing means and said lever, said cam profile having a curvature characteristic which is effective upon rotation of the lever about its pivot axis to vary the moment arm through which the force of said constant force producing means acts to produce a balancing torque, whereby the resultant pivotal movement of said lever is proportional to the square root of the input force applied thereto; adjustment means for selectively varying the distance between said inextensible tape and said pivot axis to permit modification of the magnitude of said moment arm when said measured variable is zero; said lever being arranged relative to said adjustment means to be free of movement by variation of said distance throughout a predetermined range; and means responsive to movement of said lever for producing an electrical output control signal proportional to the magnitude of the movement of said lever.

5. Apparatus for measuring the rate of fluid flow in a conduit comprising in combination: a lever mounted for pivotal movement about a pivot axis; means for applying a variable input force to said lever at a substantially fixed distance from its pivot axis to apply a variable torque to said lever continuously proportional to the magnitude of said input force, said input force being variable proportionally to the square of the rate of fluid flow being measured; means for applying a balancing torque to said lever by applying a substantially constant opposing force thereto at a distance from its pivot axis which varies with the pivoted position of said lever proportionally to the magnitude of the square of the rate of fluid flow, whereby the resultant pivotal movement of said lever is proportional to said rate of fluid flow; means operable independently of the position of said lever corresponding to zero magnitude of said measured variable for selectively varying the position of said lever at which said constant opposing force becomes effective to cause pivotal movement of said lever to be proportional to the magnitude of the rate of fluid flow; and means responsive to movement of said lever for producing an output signal proportional to the magnitude of the movement of said lever.

6. Apparatus comprising in combination: a lever mounted for pivotal movement about a pivot axis; means for applying a variable input force to said lever at a substantially fixed distance from its pivot axis to apply a variable torque to said lever continuously proportioned to the magnitude of said input force; a cam fixed to said lever; means for applying a second torque to said lever in opposition to and balancing said variable torque, said opposing torque means including means connected to said lever for producing a substantially constant force; said opposing torque means also including cam follower means engageable with the profile of said cam through at least a portion of the pivotal movement of said cam and effective with said cam to vary the moment arm about said pivot axis through which the force of said force producing means acts proportionally to the magnitude of said input force, whereby the resultant pivotal movement of said lever is proportional to the square root of the input force applied thereto; means responsive to movement of said lever for producing an output signal proportional to the magnitude of the movement of said lever; and means for adjustably shifting said cam relative to said lever for establishing and varying the distance between the profile of said cam and said cam follower means.

7. The combination defined in claim 6 wherein said lever is mounted for pivotal movement about its pivot axis by means of a leaf spring-fulcrum assembly, the intersection of said leaf springs forming said pivot axis.

8. The combination as defined in claim 6 comprising first adjustment means for selectively varying said constant force selectively determining the maximum and minimum magnitudes for said output force in which said lever will respond.

9. The combination defined in claim 8 comprising second adjustment means operable independently of said first adjustment means for selectively determining only the minimum magnitude of said output force to which said lever will respond.

10. The combination as defined in claim 9 wherein said second adjustment means is operable to selectively vary said moment arm.

References Cited in the file of this patent
UNITED STATES PATENTS

| | | |
|---|---|---|
| 392,617 | Lieb et al. | Nov. 13, 1888 |
| 1,893,200 | Dolbey et al. | Jan. 3, 1933 |
| 2,686,893 | Markson | Aug. 17, 1954 |
| 2,794,971 | Hornfeck | June 4, 1957 |
| 2,814,312 | Booth et al. | Nov. 26, 1957 |